E. J. O'NEILL AND H. T. WHITE.
AUTOMATIC STOCK FEEDING DEVICE.
APPLICATION FILED FEB. 2, 1922.

1,429,297.

Patented Sept. 19, 1922.

Inventors
Emmett J. O'Neill
and Hubert T. White
By William C. Linton.
Attorney

E. J. O'NEILL AND H. T. WHITE.
AUTOMATIC STOCK FEEDING DEVICE.
APPLICATION FILED FEB. 2, 1922.
1,429,297.
Patented Sept. 19, 1922.
2 SHEETS—SHEET 2.
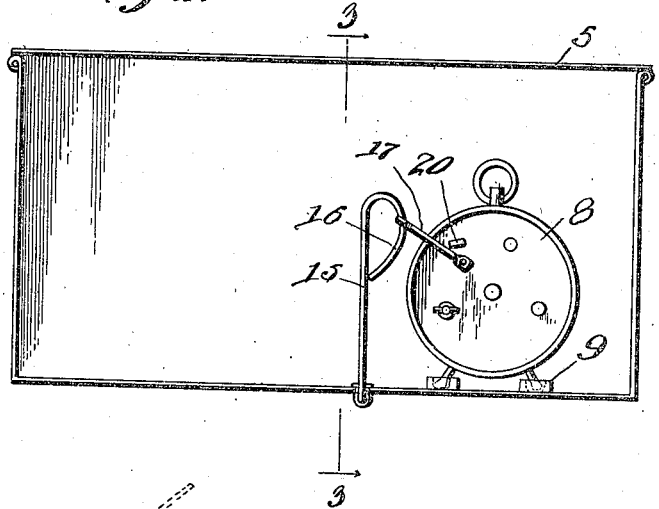
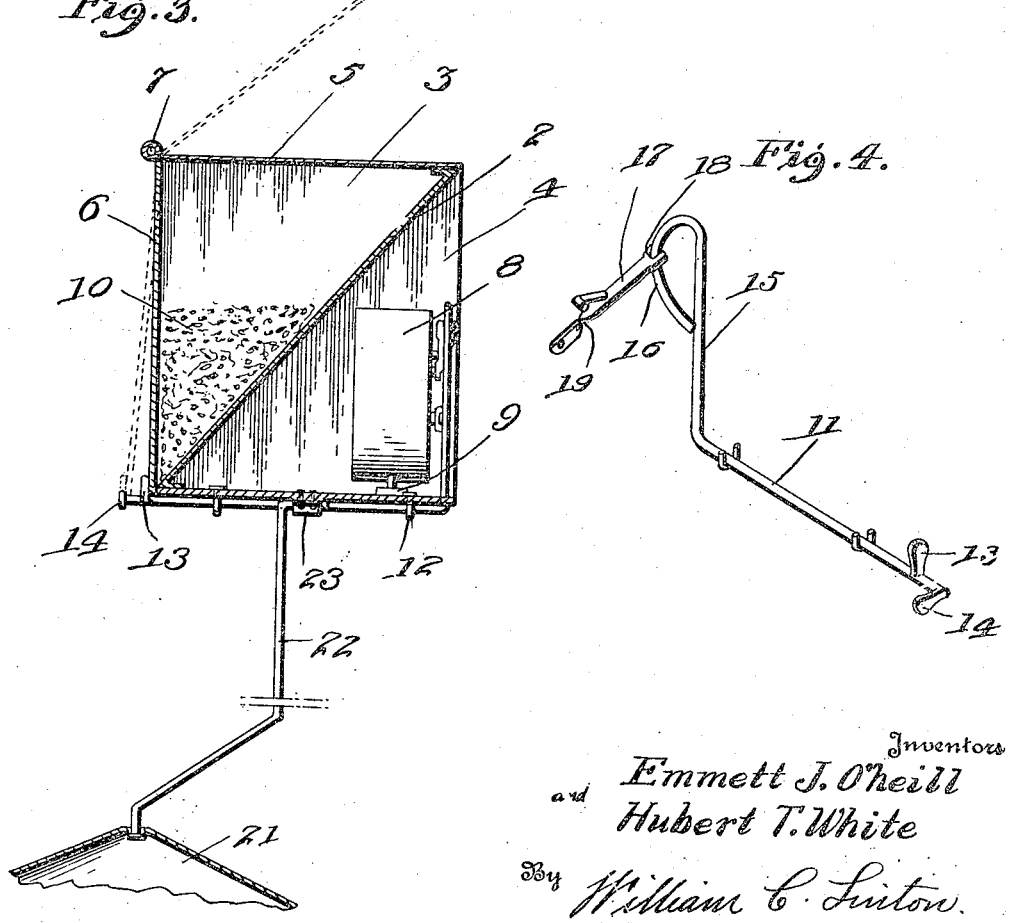
Inventors
Emmett J. O'Neill
and Hubert T. White
By William C. Linton
Attorney Patented Sept. 19, 1922.

1,429,297

UNITED STATES PATENT OFFICE.

EMMETT J. O'NEILL AND HUBERT T. WHITE, OF FAIRMONT, WEST VIRGINIA.

AUTOMATIC STOCK-FEEDING DEVICE.

Application filed February 2, 1922. Serial No. 533,632.

*To all whom it may concern:*

Be it known that we, EMMETT J. O'NEILL and HUBERT T. WHITE, citizens of the United States of America, residing at Fairmont, in the county of Marion and State of West Virginia, have invented certain new and useful Improvements in Automatic Stock-Feeding Devices; and we do hereby declare that the following is a full, clear, concise, and exact description of the invention, such as will enable others skilled in the art to which it appertains to make and use the same.

This invention relates to improvements in automatic stock feeding devices, having for an object to provide a time controlled automatic poultry feeding device employing settable means for effecting the opening or release of the feed discharge door or other controlling means of such a device, whereby the feed may be automatically discharged from the same at a predetermined period or time.

It is likewise an object of the invention to provide the device with a novel form of latching arm for releasably securing the feed discharge door in its closed position and with release of the same, to limit the outward swinging of the door in order that an even or uniform flow of feed from the device will be ensured, such arm being actuated from the time operated mechanism associated with the invention.

Other objects will be in part obvious and in part pointed out hereinafter.

In order that the invention and its mode of operation may be readily understood by persons skilled in the art, we have in the accompanying illustrative drawings and in the detailed following description based thereon set out one possible embodiment of the same.

In these drawings:—

Figure 2 is a rear elevation of the housing of the device;

Figure 3 is a vertical transverse section taken on the line 3—3 of Figure 2 looking in the direction in which the arrows point and likewise, showing the particular form of feed deflector employed in connection with the device; and, Figure 4 is an enlarged detail in perspective of the improved latching arm and the actuating means therefor.

Figure 1:
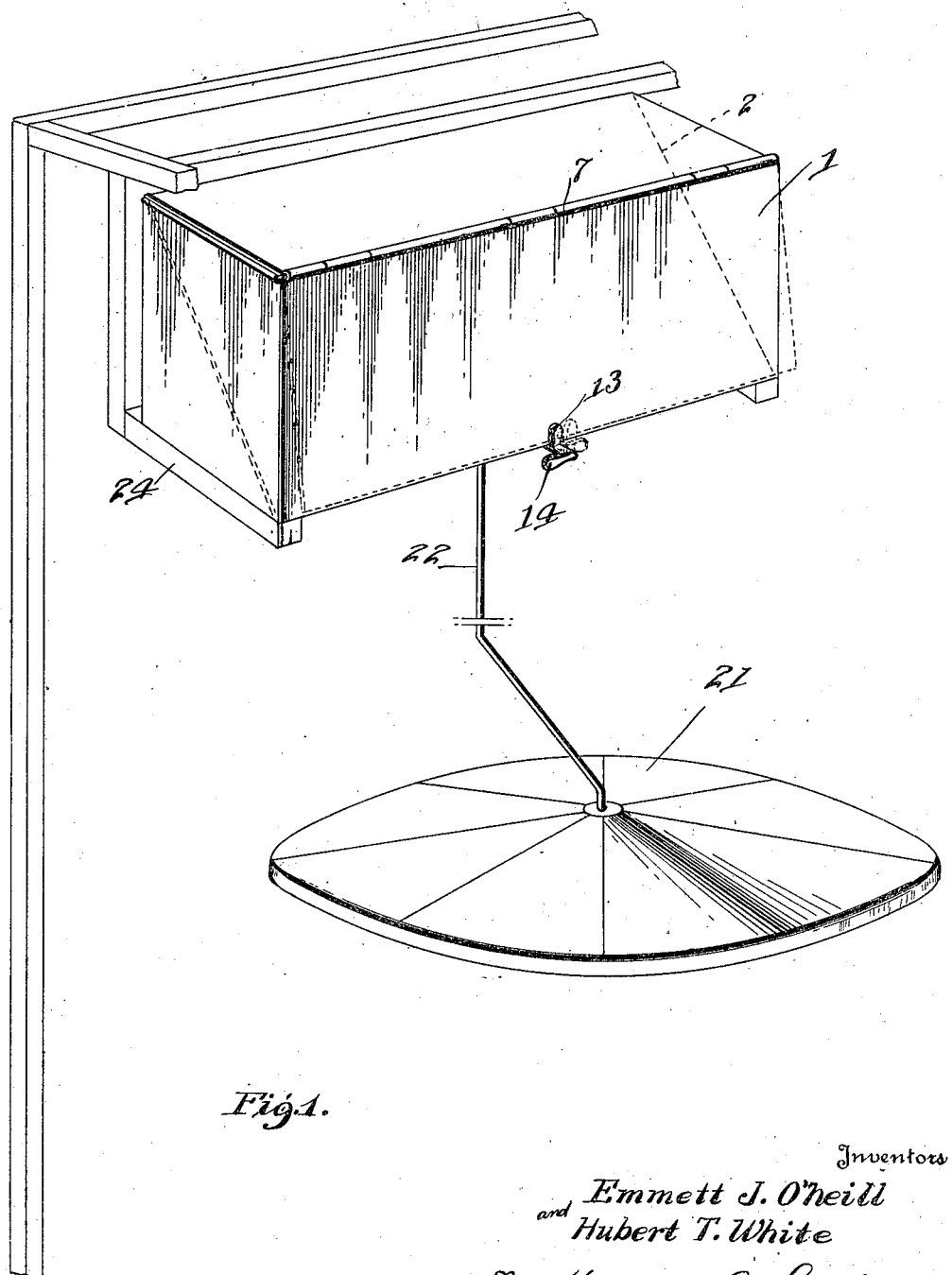
Figure 1 is a perspective view of the improved feeding device.

Having more particular reference to the drawings, in connection with which like characters of reference will designate corresponding parts throughout, the improved automatic feeding device may be stated to comprise a box like housing indicated in its entirety by the numeral 1, said housing being diagonally divided by means of a partition wall 2 whereby to provide compartments 3 and 4; the compartment 3 having a hinged closure or cover 5 and a hinged laterally and outwardly swinging door 6 pivoted to one side thereof as at 7 and obviously, affording a movable outer wall for the same. The compartment 4 has the forward wall thereof open and is adapted to receive therein a clock 8 of the ordinary alarm type, the alarm of which may be set for operation at a predetermined time; the legs of the clock being suitably received in brackets 9 arranged in the bottom of the compartment 4 as shown in the Figures 2 and 3, whereby to prevent its accidental displacement.

With a view towards providing means for releasably securing the free or lower portion of the laterally and outwardly swinging door 6 in closed position whereby to prevent the discharge of feed 10 from the hopper like compartment 3, we provide a latching arm or rod 11, disposing the same transversely of the intermediate portion of the bottom of said housing 1 and rotatably securing it to the lower face of said bottom through the medium of substantially U-shaped brackets or bolts 12.

Fixedly arranged upon one portion of the rod 11, preferably at a point in proximity to its outer extremity, is a substantially right angularly disposed finger or latching element 13, while upon the outer extremity of said rod, a similar finger 14 is arranged, this latter finger, however, as will be noted upon reference to the Figures 3 and 4, being arranged at substantially right angles with relation to the finger 13. The remaining extremity or inner portion of the transverse rotatable rod 11 is bent at substantially right angles as indicated at 15 and has the free portion thereof bent upon itself in looped shape fashion as indicated at 16, providing a curved or cam like engaging surface, the purpose of which will be presently described. In this connection, it is to be noted that the arrangement of the right angular arm 15 is such as to bring the same in proximity to the alarm clock or time controlled mechanism 8 arranged in the rearward compartment 4 of the housing 1, as shown in the Figure 2; the curved cam like bearing portion of the loop 16 being disposed towards said clock, and by reason of the off-center application of weight to the extremity of said right angular arm will tend to rotate the rod 11 in a direction towards the clock.

Fixedly secured to the spring winding key of the alarm mechanism of the clock is a flattened metal arm 17 having the outer end thereof bifurcated as at 18, while the intermediate portion of the same is twisted as at 19 in order that said bifurcated portion 18 may be loosely engaged over the curved or cam like bearing portion of the loop 16. To limit rotary movement of the arm 17 with the winding key of the alarm mechanism of the clock 8, we may and preferably do arrange a stop pin 20 upon the adjacent side of said clock and as will be understood, the arm 17 will be permitted to make approximately one full revolution, whereupon further rotary movement of the same will be prevented.

In order that the feed 10 discharged from the hopper like compartment 3 of the device may be effectually spread or scattered, we may and preferably do secure a conical deflector 21 to the housing 1 through the medium of an angular bracket arm 22, the upper end of which is formed with a right angular finger adapted to be engaged by a suitable clamp 23 secured to the under side of the bottom of the housing 1 as shown in the Figure 3. This conical deflector 21 is arranged directly below the opening formed with outward swinging of the lower portion of the door 6 and by consequence, the grain falling downwardly thereonto will strike its inclined surfaces, and thereupon be evenly distributed or scattered about the floor of the poultry house receiving the device.

In using the improved automatic stock feeder, the housing 1 may be and preferably is secured upon suitable supports, such as indicated for the purpose of convenience by the numerals 24 in the Figure 1, such fixtures, if desired, being connected to the rafters or other supports of the house. The hopper like compartment 3 is supplied with that amount of feed 10 necessary by way of the opening formed in the top thereof normally closed by the vertically swinging cover 5. At this time, the laterally and outwardy swinging door 6 is secured in its innermost or closed position by engagement of the right angular finger 13 with the outer portion of the lower extremity thereof as shown in the Figure 3, at which time, the right angular arm 15 will be in a substantially vertical or perpendicular position as shown in the Figure 2, the curved portion of the loop 16 being engaged adjacent its upper curved extremity with the bifurcated portion 18 of the actuating arm 17 secured to the winding key of the alarm mechanism of the clock 8. The alarm mechanism of the clock is set for a predetermined time and with operation of the same, the winding key carrying the arm 17 will be rotated in a reverse direction, thus swinging the bifurcated outer end of the arm downwardly and over the curved cam like bearing portion of the loop 16, imparting an outward thrust to said loop and by consequence, moving the right angular arm 15 correspondingly. Such movement of the arm 15 will effect rotation of the rod 11 in a direction to cause the finger 13 to be disengaged from the lower portion of the outwardly swinging door 6, which because of the pressure applied thereto from the feed 10 will be swung outwardly to the position shown in dotted lines in the Figure 3, forming a discharge opening or way and permitting of an even discharge of the feed 10 from the hopper-like compartment 3 downwardly onto the deflector 21 for scattering about the device. With sufficient rotary movement of the arm 11 transmitted thereto from the right angular arm 15 to effect disengagement of the finger 13 from the door 6, the arm 14 upon the outer extremity thereof will be brought to a vertical position such as shown in dotted lines in the Figure 3, whereupon it will then engage the lower portion of the door 6 and by consequence, serve to check any further outward swinging movement of the same, hence, limiting the size of the discharge way through which the feed 10 passes, and therefore, ensures an even or uniform flow of feed downwardly onto the deflecting element 21. Subsequent to the imparting of an outward thrust to the looped portion 16 of the arm 15, it will be understood that further rotary movement of the arm 17 is unnecessary and to limit the rotary movement of said arm in its reverse direction, the stop pin 20 is provided and as will be understood, will be engaged by the intermediate portion of said arm when the same has completed an approximately full revolution.

Manifestly, the construction shown is capable of considerable modification and such modification we consider within the spirit of our invention.

We claim:

1. A poultry feeding device comprising a housing diagonally divided into a plurality of compartments, an outwardly swinging door pivoted to one side of the housing and forming a wall for one of said compartments, a rotatable rod secured to and disposed transversely of the bottom of said housing having a right angularly arranged finger thereon in proximity to its outer extremity normally engaged with the lower portion of said door for retaining the same in closed position and a second finger on its outer extremity spaced from the first finger and arranged at substantially right angles thereto adapted to engage said lower portion of the door subsequent to disengagement of the first finger therefrom, the opposite extremity of said rod having a substantially right angular arm arranged thereon and time controlled mechanism arranged in the remaining compartment of said housing adapted to impart movement to said right angular arm for effecting partial rotation of the transverse rod.

2. A poultry feeding device comprising a housing diagonally divided into a plurality of compartments, an outwardly and laterally swinging door pivoted to one side of the housing and providing an outer wall for one of said compartments, a rotatable rod secured to and disposed transversely of the bottom of said housing, having a right angularly arranged finger thereon in proximity to said outer extremity normally engaged with the lower portion of said door for retaining the same in its closed position and a second finger on its outer extremity spaced from said first finger and arranged at substantially right angles thereto adapted to be engaged with the lower portion of said door subsequent to disengagement of the first finger therefrom, the inner portion of said rod having a substantially right angularly disposed arm thereon provided on its free end with a curved cam like bearing element, time controlled mechanism in the remaining compartment of said housing, an arm connected to the rotatable element of said time controlled mechanism having its outer end bifurcated and engaged with the curved cam like extension on said arm and means on the time controlled mechanism for limiting rotary movement of said arm.

In witness whereof we have hereunto set our hands.

EMMETT J. O'NEILL.
HUBERT T. WHITE.